United States Patent [19]
Moon

[11] Patent Number: 5,641,210
[45] Date of Patent: Jun. 24, 1997

[54] BRAKE PRESSURE CONTROL APPARATUS FOR AN ANTI-LOCK BRAKING SYSTEM IN AUTOMOBILES

[75] Inventor: Sung-Dai Moon, Kyeongsangbuk-Do, Rep. of Korea

[73] Assignee: Daewoo Electronics Co., Ltd., Seoul, Rep. of Korea

[21] Appl. No.: 580,544

[22] Filed: Dec. 29, 1995

[30] Foreign Application Priority Data

Feb. 21, 1995 [KR]  Rep. of Korea ............... 95-3373

[51] Int. Cl.$^6$ ............................................. B60T 8/36
[52] U.S. Cl. ............................. 303/119.1; 303/113.1
[58] Field of Search ........................ 303/113.1, 116.1, 303/116.4, 119.1, 119.2, 9.75, 10

[56] References Cited

U.S. PATENT DOCUMENTS

| | | | |
|---|---|---|---|
| 3,752,268 | 8/1973 | Gfeller | 303/180 |
| 3,905,653 | 9/1975 | Muller et al. | 303/119.2 |
| 4,082,369 | 4/1978 | Black et al. | 303/116.4 X |
| 4,166,656 | 9/1979 | Depas, Sr. | 303/113.2 |
| 5,511,861 | 4/1996 | Liu | 303/113.1 |

*Primary Examiner*—Lee W. Young
*Attorney, Agent, or Firm*—Fish & Richardson, P.C.

[57] ABSTRACT

A brake pressure control apparatus for automobiles with an anti-lock braking system, which can be easily operated with a simple construction, and in which a rotary valve can be immediately returned to its initial position after the first ABS operation has finished in order to prepare for the second ABS operation, is disclosed. The apparatus has a housing connected to a hydraulic pump to receive the pressure fluid, a motor mounted on the upper surface of the housing to generate a rotational force, a bushing for guiding the pressure fluid from the housing, a rotary valve rotatably accommodated in the bushing to transfer the pressure fluid which has guided through the bushing to a wheel cylinder or a fluid tank, and a sensor assembly which senses an electric signal varied according to the rotation of the rotary valve and then sends the electric signal to an electrical control unit. The apparatus can be manufactured with reduced cost, and can be easily applied to the ABS.

15 Claims, 5 Drawing Sheets

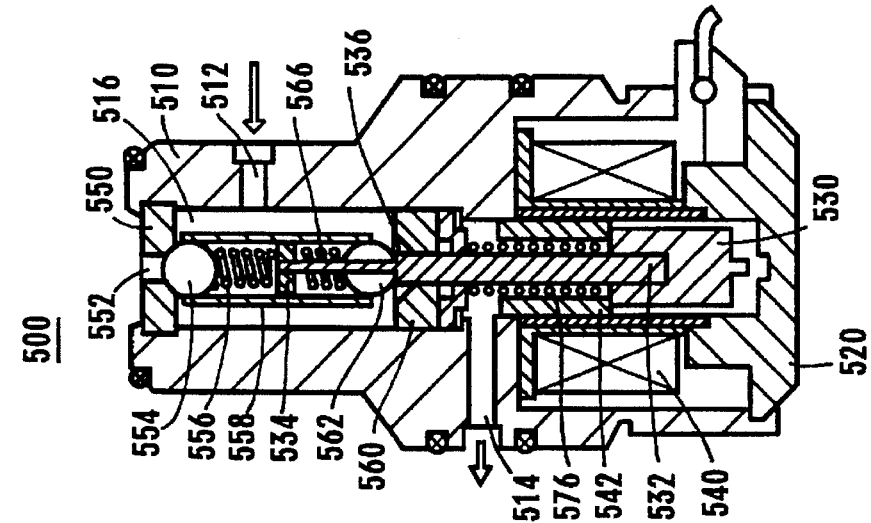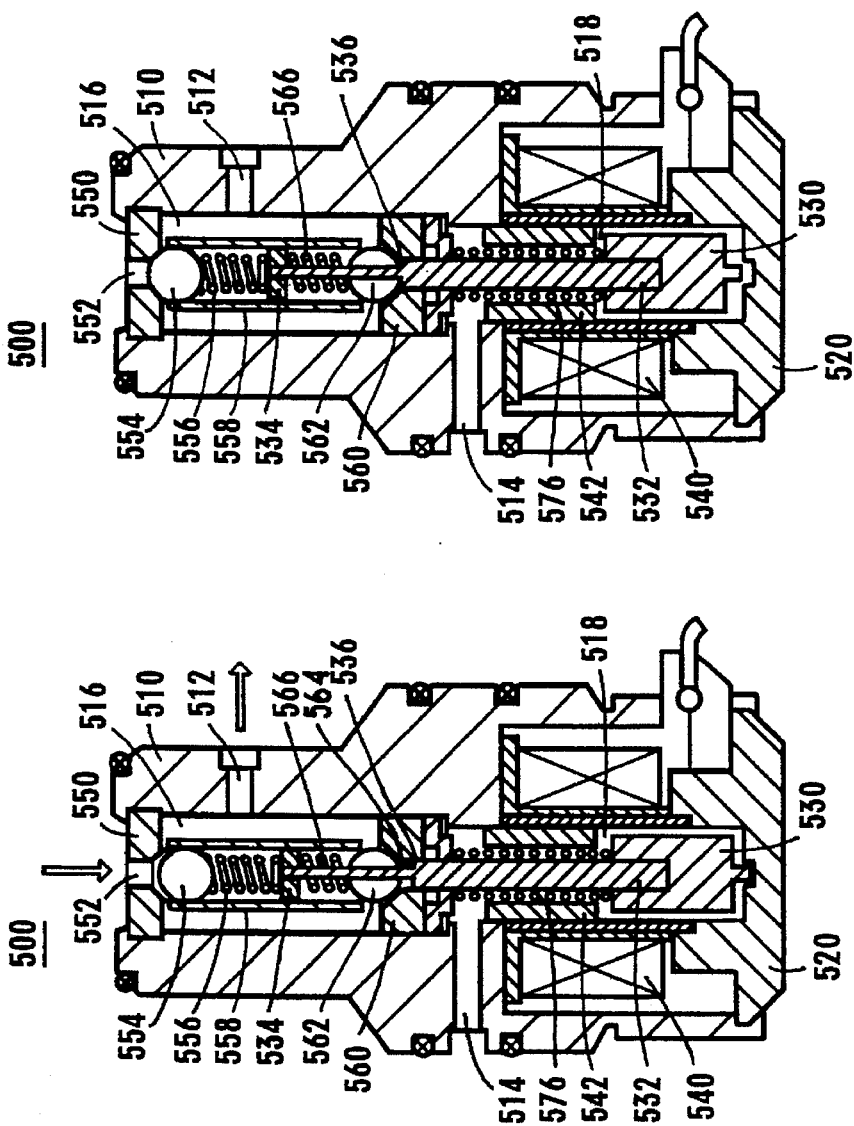

BRAKE PRESSURE CONTROL APPARATUS FOR AN ANTI-LOCK BRAKING SYSTEM IN AUTOMOBILES

BACKGROUND OF THE INVENTION

1. Field of the Invention

The present invention relates to a brake pressure control apparatus for an anti-lock braking system in automobiles, and more particularly to a brake pressure control apparatus for an anti-lock braking system in automobiles, which has a simple construction and easily operates.

2. Prior Arts

Generally, an anti-lock braking system (ABS) is used for preventing the wheels of the automobile from "locking" in the event of a sudden stop of the automobile. The term "locking of the wheels" means that the rolling wheels of the automobile are stopped by the brake pressure applied to the wheels when a driver suddenly puts on the brake while driving the automobile. When the wheels are subjected to this type of locking condition, the wheels slip toward the running direction due to the inertia force of the vehicle so that the frictional force between the wheels and the road surface may be reduced. For this reason, the braking distance may become longer and steering the vehicle may be impossible, thereby causing fatal accidents.

In order to prevent these types of accidents, an anti-lock braking system is provided in the vehicle. The anti-lock braking system increases, maintains, and reduces the brake pressure applied to the wheels rapidly and repeatedly so as to avoid wheel locking, thereby preventing fatal accidents.

Generally, the ABS comprises a valve system operated by a hydraulic pump or an electric signal in order to increase, maintain and reduce the brake pressure applied to the wheels, a sensor for sensing the RPM of the wheels, and a control unit which operates the ABS according to a predetermined algorithm.

In the ABS as mentioned above, the first step wherein the brake pressure applied to the wheels is increased is called a pressure increasing mode, the second step wherein the brake pressure applied to the wheels is constantly maintained is called a pressure maintaining mode and the third step wherein the brake pressure applied to the wheels is reduced is called a pressure reducing mode.

In the conventional ABS, the pressure increasing mode, the pressure maintaining mode and the pressure reducing mode are performed by operating a solenoid valve.

FIGS. 9A–9C show a solenoid valve 500 under the pressure increasing mode, the pressure maintaining mode and the pressure reducing mode of the conventional ABS, respectively.

As shown in FIGS. 9A–9C, solenoid valve 500 includes a cylindrical valve body 510 and a cover 520 attached to the lower end of cylindrical valve body 510 for preventing the pressure fluid from being leaked. Cylindrical valve body 510 has a first port 512 connected to a wheel cylinder (not shown), a second port 560 through which the pressure fluid circulates to a pump (not shown), a first chamber 516 formed above second port 560, and a second chamber 518 formed below second port 560.

An upper valve seat 550 having a pressure fluid inlet 552 is provided at the upper end of first chamber 516 and a lower valve seat 560 having a pressure fluid outlet 564 is provided at the lower end of first chamber 516. A cylinder 558 is disposed between upper valve seat 550 and lower valve seat 560. At the upper and lower ends of cylinder 558, there are provided first and second balls 554 and 562, respectively. First ball 554 is in contact with upper valve seat 550, and second ball 562 is in contact with lower valve seat 560.

In addition, first and second springs 556 and 566 are accommodated in cylinder 558 in such a manner that first and second springs 556 and 566 can elastically support first and second balls 554 and 562, respectively. Between first and second springs 556 and 566, there is disposed a head portion 534 of a movable plunger 532. Head portion 534 pushes first spring 556 when plunger 532 moves upwards, thereby pressure fluid inlet 552 of upper valve seat 550 is closed by first ball 554.

Second chamber 518 of valve body 510 includes an armature 530 securely coupled to one end of plunger 532, a bush 542 inserted in the upper end portion of second chamber 518 in order to guide the movement of plunger 532, and a solenoid 540 which applies the magnetic force to armature 530 thereby moving armature 530 upwards. Between armature 530 and the underside of lower valve seat 560, a third spring 576 is disposed for elastically supporting armature 530.

The conventional solenoid valve having the above structure operates as follows.

When a driver suddenly puts on the brake, the speed of the vehicle suddenly decreases. At this time, a speed sensor (not shown) attached to the wheel of the vehicle senses the decreased speed and then sends the data to an electrical control unit (ECU, not shown). Upon receiving the data from the speed sensor, the ECU compares value of the data with a predetermined value which is preset in the ECU. If the value of the data exceeds the predetermined value, the ECU operates the ABS according to a predetermined algorithm. That is, the brake pressure applied to the wheels of the vehicle is continuously increased (the pressure increasing mode), constantly maintained (the pressure maintaining mode) or reduced (the pressure reducing mode) in accordance with the predetermined algorithm of the ECU.

In the pressure increasing mode, as shown in FIG. 9A, the ECU operates a hydraulic pump (not shown) so that the pressure fluid flows into pressure fluid inlet 552 from the hydraulic pump while pushing first ball 554 downwards. Then, the pressure fluid that has flowed into pressure fluid inlet 552 is applied to the wheel cylinder connected to the wheels through first port 512, so that the brake pressure to the wheels increases.

Next, electric power is applied to solenoid 540 so that magnetic power is generated by solenoid 540. As the magnetic power is generated, armature 530 moves upwards while overcoming the bias force of third spring 576.

When armature 530 moves upwards, plunger 532 securely inserted in armature 530 also moves upwards while pushing first spring 556 upwards. Therefore, as shown in FIG. 9B, pressure fluid inlet 552 is closed by first ball 554.

From this state, the pressure fluid does not flow into solenoid valve 500 so that solenoid valve 500 maintains the pressure maintaining mode, wherein the constant brake pressure is applied to the wheels.

While, as the electric power is continuously applied to solenoid 540, armature 530 moves upwards to the underside of bush 542 inserted in the upper end portion of second chamber 518 of valve body 510 as shown in FIG. 9C. Accordingly, second ball 562 rested in lower valve seat 560 is simultaneously pushed by a neck portion 536 of plunger 532 so that second ball 563 moves upwards. At this time, the pressure fluid leaks through a fine gap formed between pressure fluid outlet 564 of lower valve seat 560 and plunger 532, and then, the leaked pressure fluid is exhausted to a fluid tank (not shown) through second port 514. From this state, solenoid valve 500 maintains the pressure reducing mode wherein the brake pressure applied to the wheels of the vehicle reduces.

The conventional solenoid valve rapidly repeats the above pressure increasing mode, the pressure maintaining mode and the pressure reducing mode in a short time period, thereby preventing the wheels from locking even when the driver suddenly puts on the brake.

However, since the conventional solenoid valve requires various elements, the construction of the conventional solenoid valve may be complicated. Therefore, not only controlling the conventional solenoid valve is difficult, but also the cost for manufacturing the conventional solenoid valve is increased.

Further, the first, second and third springs must be manufactured accurately for performing the pressure increasing mode, the pressure maintaining mode and the pressure reducing mode of the solenoid valve precisely. Thus, the manufacturing of the solenoid valve is difficult.

On the other hand, a U.S. patent application entitled "a brake pressure control apparatus for an anti-lock braking system in automobiles" which is manufactured at a low cost with a simple construction and is easily operated, has been filed by the applicant of the present invention and now is pending.

In the above brake pressure control apparatus, the pressure increasing mode, the pressure maintaining mode and the pressure reducing mode are performed by operating a rotary valve without using the solenoid valve.

However, in the above brake pressure control apparatus, the rotary valve does not exactly return to its initial position in which the rotary valve communicates with a wheel cylinder so as to perform the pressure increasing mode, after the first ABS operation has finished.

That is, after the first ABS operation has finished, it is possible for the rotary valve to be stopped at the second position in which the communication between the rotary valve and the wheel cylinder is closed such that the pressure maintaining mode is performed, or the third position in which the rotary valve communicates with a fluid tank so as to perform the pressure reducing mode. In this case, the wheels of vehicle slip toward the running direction momentarily as the second ABS operation starts.

In other words, if the rotary valve is stopped at the first position after the first ABS operation has finished, the braking pressure flows instantly from a hydraulic pump to the wheel cylinder through the rotary valve when the second ABS operation staffs, thereby the normal second ABS operation is performed.

On the contrary, if the rotary valve is stopped at the second position or third position after the first ABS operation has finished, the braking pressure does not instantly flow from the hydraulic pump to the wheel cylinder when the driver suddenly puts on the brake since the communication between the rotary valve and the wheel cylinder is closed. Accordingly, the second ABS operation is momentarily delayed, and thereby the wheels of the vehicle slip in the running direction.

This type of slip confuses the driver and causes accidents.

SUMMARY OF THE INVENTION

The present invention has been made to overcome the above described problems of the prior arts, and accordingly it is an object of the present invention to provide a brake pressure control apparatus for automobiles with an anti-lock braking system, which can be easily operated with a simple construction, can be manufactured with a reduced cost, and in which a rotary valve can be immediately returned to its initial position after the first ABS operation has finished in order to prepare the second ABS operation.

To achieve the above object, the present invention provides a brake pressure control apparatus for an anti-lock braking system in automobiles, the apparatus comprising:

a housing for receiving a pressure fluid from a hydraulic pump, the housing connected to the hydraulic pump;

a motor for generating a rotational force according to an operating signal from an electrical control unit, the motor having a motor cap;

a bushing for guiding the pressure fluid which has flowed through the housing;

a rotary valve for receiving the pressure fluid guided by the bushing so as to transfer the pressure fluid to a wheel cylinder or a fluid tank alternately, the rotary valve being rotatably accommodated in the bushing and rotated by the motor; and a sensor assembly for sensing an electric signal which varies according to a rotation of the rotary valve and then transmitting the electric signal to the electrical control unit, wherein the electrical control unit detects positions of the rotary valve and operates the motor after an operation of the anti-lock braking system has finished so as to return the rotary valve to its initial position.

According to a preferred embodiment of the present invention, the sensor assembly is provided at an inner upper wall of the motor cap and includes a supporting member secured to the inner upper wall of the motor cap and a variable resistor coupled to the supporting member.

The supporting member has a first surface secured to the upper inner wall of the motor cap and a second surface formed with an annular recess and a slot thereon. The variable resistor has an annular-pattern resistance section securely inserted in the annular recess of the supporting member, a moving terminal section which slides along an upper surface of the annular-pattern resistance section as the motor shaft rotates, and a fixed portion inserted in the slot of the supporting member such that the fixed portion continuously contacts the moving terminal section.

The annular-pattern resistance section has first and second ends between which a difference in potential is generated as the electric signal is applied to them. The moving terminal section is closely disposed around the motor shaft such that the moving terminal section can rotate together with the motor shaft. The moving terminal section is integrally formed with a sliding portion which slides along the upper surface of the annular-pattern resistance section so as to generate a variable electric signal. The sliding portion is provided with a contacting portion for contacting the upper surface of the annular-pattern resistance section.

The brake pressure control apparatus having the above structure operates as follows.

Firstly, when a driver suddenly puts on the brake, the speed of the vehicle decreases suddenly. At this time, a speed sensor attached to the wheel of the vehicle senses the decreased speed and then sends the data to the ECU. When the value of the data exceeds the predetermined value, the ECU operates the ABS according to a predetermined algorithm, thereby the brake pressure applied to the wheels of the vehicles is repeatedly increased, maintained and reduced.

On the other hand, when the rotary valve is stopped at the second position in which the pressure maintaining mode is performed, or the third position in which pressure reducing mode is performed after the ABS operation has finished, the ECU detects the positions of the rotary valve based on the electric signal transmitted from the variable resistance and then further operates the motor so that the return rotary valve is returned to its initial position.

As described above, the brake pressure control apparatus for anti-lock braking system in vehicles according to the present invention has a simple construction and can be easily manufactured.

Further, the brake pressure control apparatus of the present invention has a compact size so that it can be easily applied to an ABS.

Furthermore, the brake pressure control apparatus of the present invention does not require many elements so that the cost for manufacturing the brake pressure control apparatus can be reduced.

BRIEF DESCRIPTION OF THE DRAWINGS

The above objects and other advantages of the present invention will become more apparent by describing in detail preferred embodiments thereof with reference to the attached drawings, in which:

FIGS. 8A to 8C are sectional views for showing a conventional solenoid valve under the pressure increasing mode, the pressure maintaining mode and the pressure reducing mode, respectively.

DESCRIPTION OF THE PREFERRED EMBODIMENTS

Hereinafter, the present invention will be described in detail with reference to the accompanying drawings.

Figure 1:
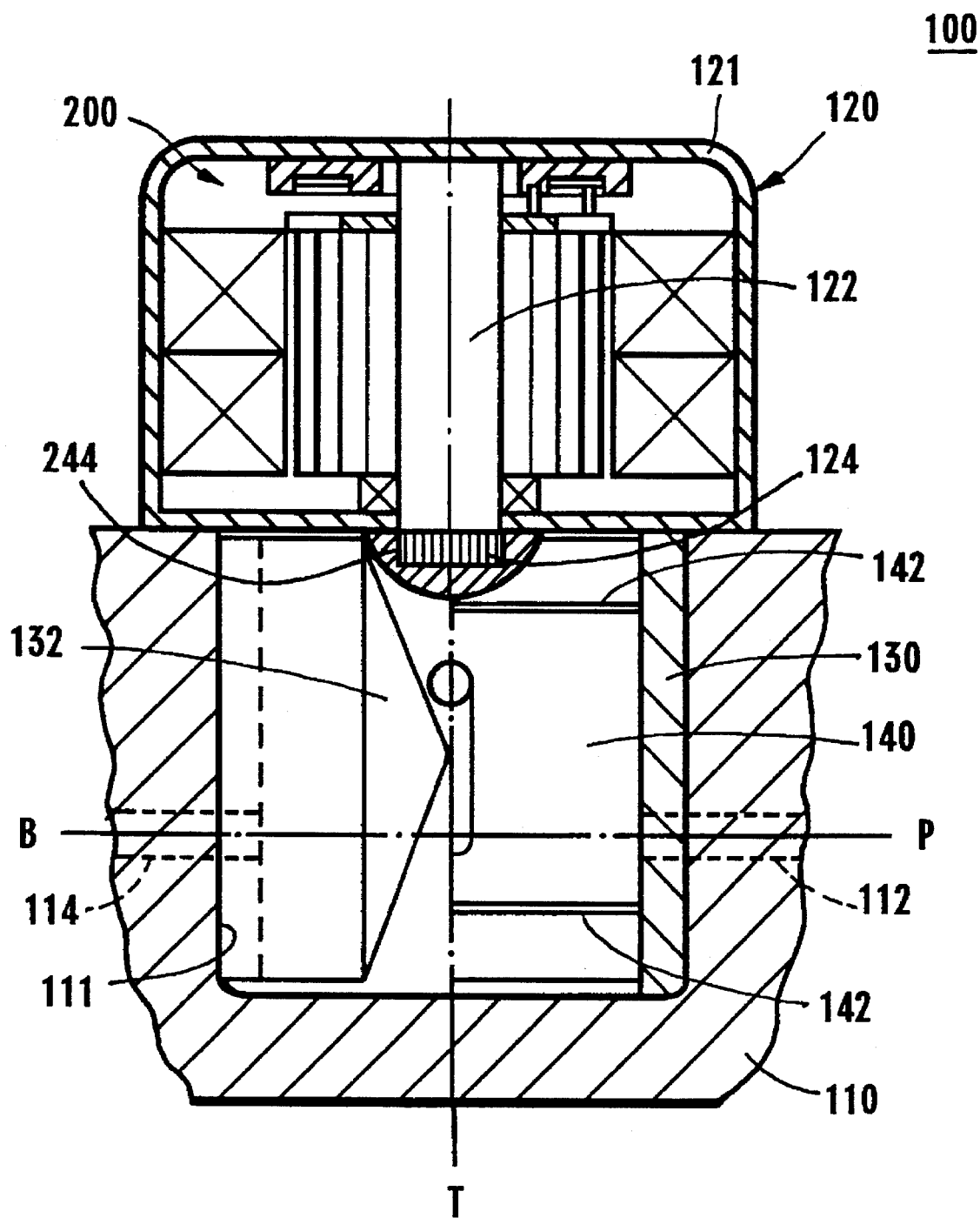
FIG. 1 is a sectional view for showing the structure of a brake pressure control apparatus used in an anti-lock braking system according to one embodiment of the present invention.

FIG. 1 shows a brake pressure control apparatus 100 for an anti-lock braking system in automobiles according to one embodiment of the present invention.

As shown in FIG. 1, brake pressure control apparatus 100 has a housing 110. Housing is connected to a hydraulic pump P in order to guide a pressure fluid from hydraulic pump P to brake pressure control apparatus 100. A motor 120 covered by a motor cap 121 is mounted on an upper surface of housing 110 for generating a rotational force according to an operating signal from an electrical control unit (ECU). A bushing 130 is securely inserted in housing 110 so that the pressure fluid which has flowed through housing 110 is guided into brake pressure control apparatus 100. Further, a rotary valve 140 is rotatably accommodated in bushing 130 so as to receive the pressure fluid from bushing 130 and is rotated by motor 120 in order to transfer the pressure fluid which has flowed through bushing 130 to a wheel cylinder B or fluid tank T, alternately. In addition, a sensor assembly 200 for sensing an electric signal which varies according to the rotation of rotary valve 140 is provided at the inner upper portion of motor cap 121 in order to transmit the sensed electric signal to the ECU.

Housing 110 has a chamber 111 for accommodating bushing 130, a first fluid path 112 connected to hydraulic pump P in order to guide the pressure fluid to bushing 130 and a second fluid path 114 connected to wheel cylinder B so as to guide the pressure fluid which has passed through bushing 130, to wheel cylinder B.

Motor 120 has a motor shaft 122 formed integrally with a spline shaft 124 at one end thereof. Spline shaft 124 is inserted in a spline groove 244 formed at the center of the upper surface of rotary valve 140 so that rotary valve 140 may rotate together with motor shaft 122 as motor shaft 122 of motor 120 rotates.

Bushing 130 has a substantially hollow cylindrical shape and some portion of its outer wall (i.e., the portion adjacent to fluid tank T) is shaped as a plane portion 132 so as to easily return the pressure fluid to fluid tank T. In addition, rotary valve 140 has oil grooves 142 at its outer wall. While the ABS is being operated, some of the brake oil leaks into oil grooves 142 so that the friction between the outer wall of rotary valve 140 and the inner wall of bushing 130 can be reduced when rotary valve 140 is rotated by motor 120.

Figure 3:
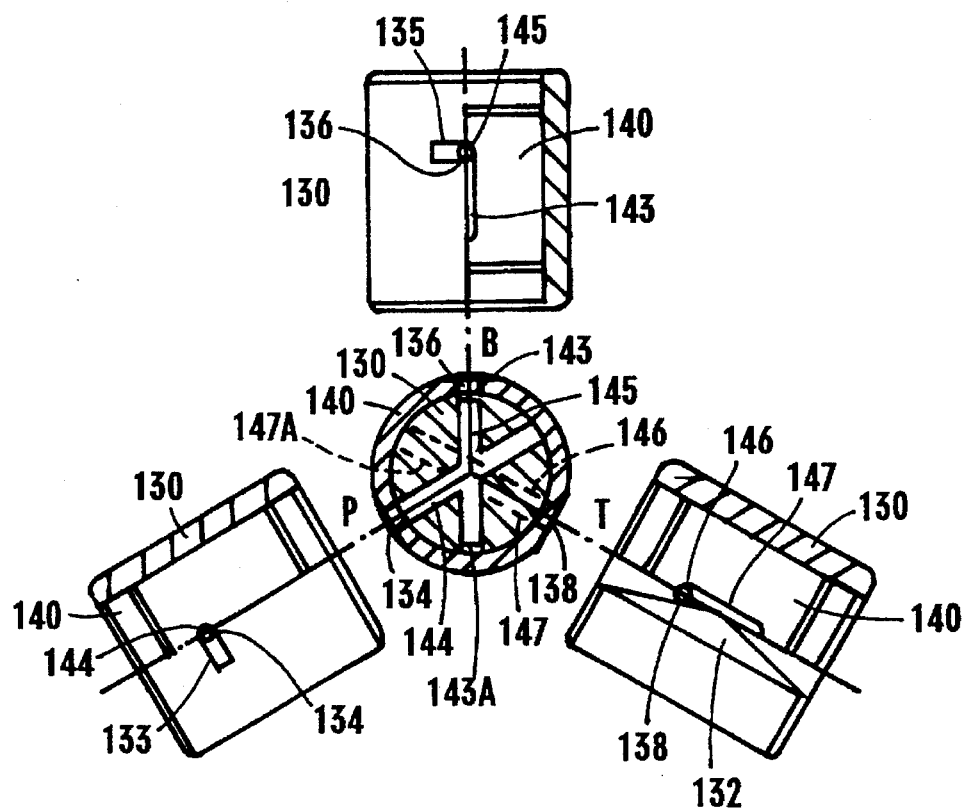
FIG. 3 is a rotational sectional view of a rotary valve shown in FIG. 1.

As shown in FIG. 3, bushing 130 has first and second cutting portions 133 and 135 at its cylindrical outer wall for easily introducing or discharging the pressure fluid. First cutting portion 133 is located in correspondence to first fluid path 112 of housing 110 in such a manner that the pressure fluid can easily flow from first fluid path 112 of housing 110 into bushing 130. Second cutting portion 135 is located in correspondence to second fluid path 114 of housing 110 in such a manner that the pressure fluid that has passed through bushing 130 can easily flow into second fluid path 114 of housing 110. Both first and second cutting portions 133 and 135 have a rectangular groove shape which can be made by a machine work, such as a lathe work.

First and second cutting portions 133 and 135 are positioned at the same longitudinal level. However, second cutting portion 135 is positioned clockwise at an angle of 120 degrees apart from first cutting portion 133. On the other hand, plane portion 132 of bushing 130 is positioned counter-clockwise at an angle of 120 degrees apart from first cutting portion 133.

At the bottom of first cutting portion 133 of bushing 130, an inlet hole 134 is formed for guiding pressure fluid to rotary valve 140. An outlet hole 136 for guiding pressure fluid to wheel cylinder B is formed at the bottom of second cutting portion 135 of bushing 130. In addition, plane portion 132 of bushing 130 has a perforation hole 138 which connects rotary valve 140 to fluid tank T. Perforation hole 138 of bushing 130 is longitudinally spaced at a predetermined length from inlet and outlet holes 134 and 136 of bushing 130.

On the other hand, rotary valve 140 has first, second, and third ports 144, 145 and 146. As rotary valve 140 rotates, first, second and third ports 144, 145 and 146 of rotary valve 140 are alternately communicated with inlet, outlet and perforation holes 134, 136 and 138 of bushing 130 in such a manner that the pressure fluid which has flowed through bushing 130 can be transferred to wheel cylinder B or can be returned to fluid tank T.

First, second and third ports 144, 145 and 146 are extended passing through rotary valve 140. First and second ports 144 and 145 of rotary valve 140 are respectively located in correspondence to inlet and outlet holes 134 and 136 of bushing 130 and third port 146 of rotary valve 140 is located in correspondence to perforation hole 138 of bushing 130. Accordingly, first and second ports 144 and 145 of rotary valve 140 are communicated with each other at the same plane and third port 146 of rotary valve 140 is longitudinally spaced at a predetermined length from first and second ports 144 and 145.

Therefore, second port 145 is positioned clockwise at an angle of 120 degrees apart from first port 144 and third port 146 is positioned clockwise at an angle of 120 degrees apart from second port 145, although third port 146 has a different longitudinal level with respect to first and second ports 144 and 145.

Accordingly, rotary valve 140 is divided into six planes by first, second and third ports 144, 145 and 146, as seen in the plan view.

In addition, rotary valve 140 has a first elongated groove 143 extended downwards from one end of second port 145, a second elongated groove 143A extended downwards from the other end of second port 145, a third elongated groove 147 extended upwards from one end of third port 146 and a fourth elongated groove 147A extended upwards from the other end of third port 146.

First and second elongated grooves 143 and 143A have the same size as third and fourth elongated grooves 147 and 147A. As rotary valve 140 rotates, first, second, third and fourth elongated grooves 143, 143A, 147 and 147A are alternately and continuously communicated with inlet, outlet and perforation holes 134, 136 and 138 of bushing 130 so that the pressure increasing mode, the pressure maintaining mode and the pressure reducing mode may be continuously performed.

Figure 2:
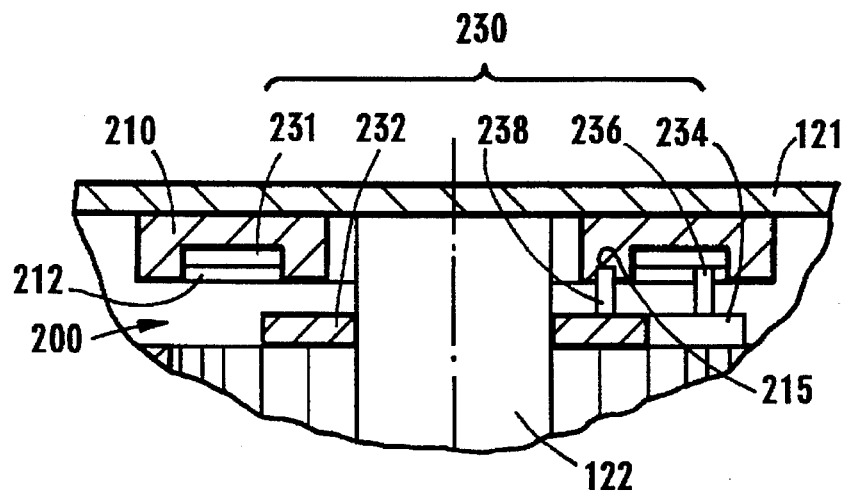
FIG. 2 is an enlarged view of a sensor assembly shown in FIG. 1.

Referring to FIG. 2, sensor assembly 200 includes a supporting member 210 and a variable resistor 230 coupled to supporting member 210. Supporting member 210 has a first surface secured to the upper inner wall of motor cap 121 and a second surface having an annular recess 212 and a slot 215 thereon. Variable resistor 230 comprises an annular-pattern resistance section 231 securely inserted in annular recess 212 of supporting member 210, a moving terminal section 232 which slides along the upper surface of annular-pattern resistance section 231 as motor shaft 122 rotates, and a fixed portion 238 inserted in slot 215 of supporting member 238 in such a manner that it constantly comes in contact with moving terminal section 232.

Figure 5:
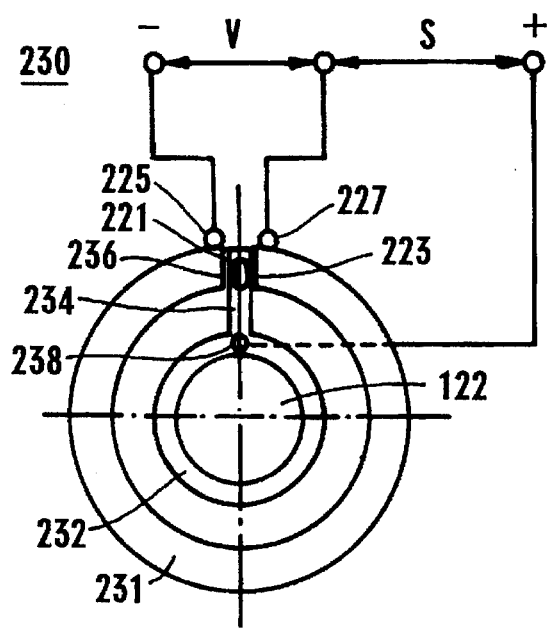
FIG. 5 is a plan view of a variable resistance shown in FIG. 1.

As detailedly shown in FIG. 5, annular-pattern resistance section 231 of variable resistor 230 has first and second ends 221 and 223 between which a difference in potential is generated as the electric signal is applied to them. First and second terminals 225 and 227 to which a wire is connected are provided at first and second ends 221 and 223, respectively.

Moving terminal section 232 is closely disposed around motor shaft 122 in such a manner that moving terminal section 232 can rotate together with motor shaft 122. While, moving terminal section 232 is insulated from motor shaft 122 so as to prevent a leakage of the electric signal therebetween. In addition, moving terminal section 232 includes a sliding portion 234 which slides along the upper surface of annular-pattern resistance section 231 so as to generate a variable electric signal. Sliding portion 234 is provided with a contacting portion 236 which comes in contact with the upper surface of annular-pattern resistance section 231.

In the mean time, since fixed portion 238 constantly comes in contact with moving terminal section 232, the electric signal which varies according to the sliding movement of moving terminal section 232 is continuously transmitted to the ECU by variable resistor 230. Therefore, after the ABS operation has finished, the ECU can detect the stop positions of rotary valve 140 based on the electric signal transmitted from variable resistor 230.

Figure 4:
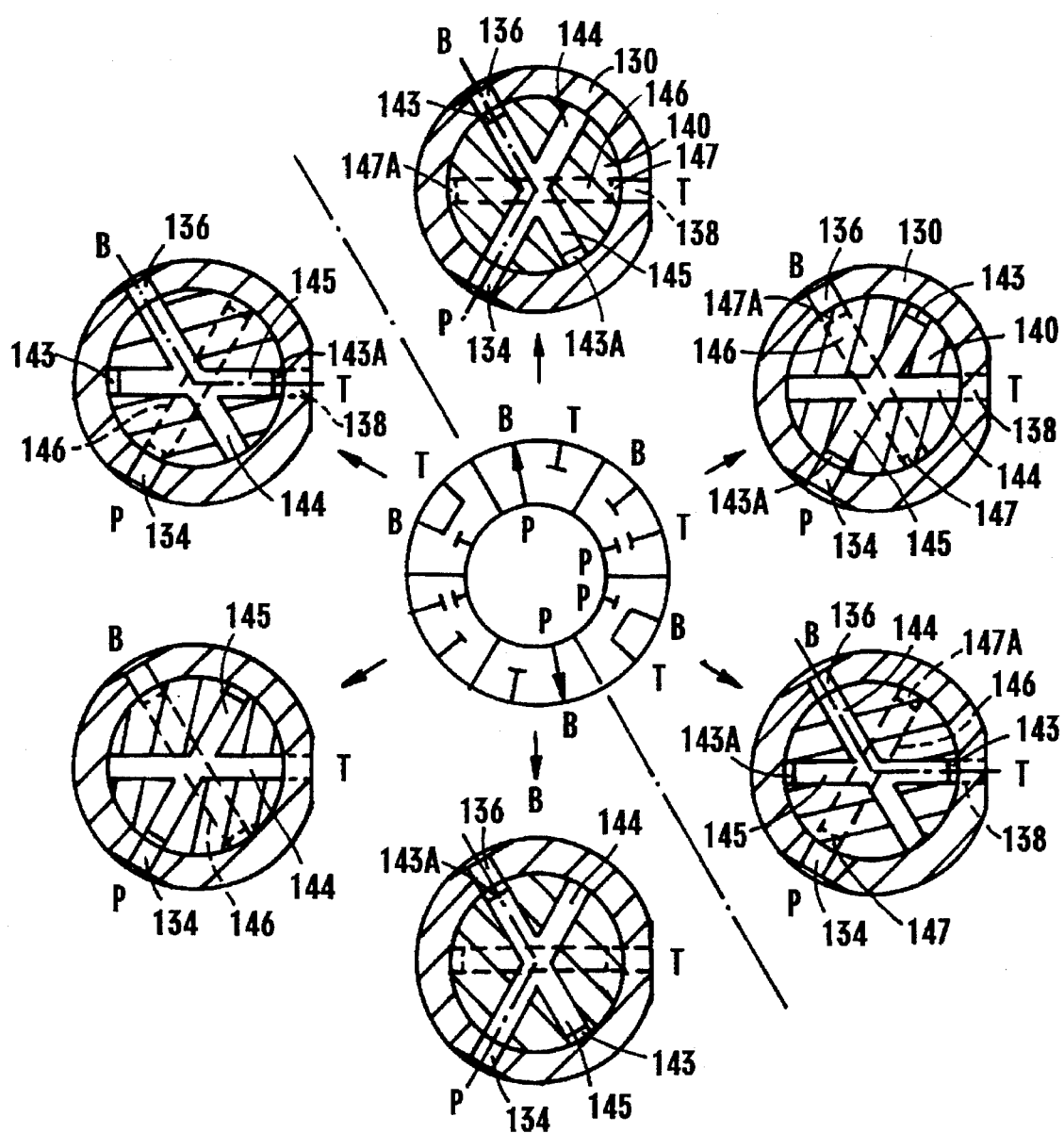
FIG. 4 is a sectional view for showing the pressure increasing mode, the pressure maintaining mode and the pressure reducing mode of the brake pressure control apparatus according to one embodiment of the present invention.

The operation of brake pressure control apparatus 100 having the above structure is shown in FIG. 4.

As shown in FIG. 4, brake pressure control apparatus 100 according to this embodiment of the present invention also has the pressure increasing mode wherein the brake pressure applied to the wheels is increased, the pressure maintaining mode wherein the brake pressure applied to the wheels is constantly maintained and the pressure reducing mode wherein the brake pressure applied to the wheels is reduced.

However, in the brake pressure control apparatus of the present embodiment, the pressure increasing mode, the pressure maintaining mode and the pressure reducing mode in relation to the wheels of the vehicle are performed by operating rotary valve 140 without using the solenoid valve.

Hereinafter, the operation of brake pressure control apparatus 100 of the present embodiment will be described with reference to FIG. 4.

Firstly, when a driver suddenly puts on the brake, the speed of the vehicle decreases suddenly. At this time, a speed sensor (not shown) attached to the wheel of the vehicle senses the decreased speed and then sends the data to the ECU. Upon receiving the data from the speed sensor, the ECU compares value of the data with a predetermined value which is preset in the ECU. If the value of the data exceeds the predetermined value, the ECU operates the ABS according to a predetermined algorithm. That is, the ECU applies an electric signal to motor 120, hydraulic pump P, and sensor assembly 200 simultaneously so that the pressure increasing mode may start.

In the pressure increasing mode, one end of first port 144 of rotary valve 140 communicates with inlet hole 134 of bushing 130 and one end of second port 145 of rotary valve 140 communicates with outlet hole 136 of bushing 130. In addition, variable resistor 230 is pre-set in such a manner that sliding portion 234 of moving terminal section 232 is positioned between first and second ends 221 and 223 of annular-pattern resistance section 231.

In this state, the pressure fluid is introduced into first port 144 of rotary valve 140 from hydraulic pump P through first fluid path 112 of housing 110, first cutting portion 133 and inlet hole 134 of bushing 130. Then, since both the other end of first port 144 and the other end of second port 145 are closed by the inner wall of bushing 130, the pressure fluid that has been introduced into first port 144 of rotary valve 140 flows into second fluid path 114 connected to wheel cylinder B by way of second port 145 of rotary valve 140, outlet hole 136 and second cutting portion 135 of bushing 130.

Thereafter, the pressure fluid that has flowed into second fluid path 114 of housing 110 is introduced into wheel cylinder B connected to the wheels of the vehicle so that brake pressure applied to the wheels of the vehicle is increased.

On the other hand, since the pressure fluid can not flow into third port 146 of rotary valve 140, the pressure fluid does not return to fluid tank T although third port 146 of rotary valve 140 communicates with fluid tank P.

In addition, since moving terminal section 232 is not connected to annular-pattern resistance section 231, the value of the resistance does not vary, and thereby an electric signal S which is transmitted from variable resistance to the ECU is constantly maintained. The ECU compares the value of electric signal S with a predetermined value and determines whether rotary valve 140 is positioned under the pressure increasing mode.

Then, rotary valve 140 is rotated clockwise by motor 120. When rotary valve 140 is rotated at an angle of 60 degrees by motor 120, one end of second port 145 of rotary valve 140 communicates with inlet hole 134 of bushing 130 and one end of third port 146 of rotary valve 140 communicates with outlet hole 136 of bushing 130 through fourth elongated groove 147A.

At the same time, sliding portion 234 of moving terminal section 232 is also rotated clockwise at an angle of 60 degrees together with motor shaft 122. From this state, the pressure maintaining mode starts.

In the pressure maintaining mode, since the other end of second port 145 and both ends of first port 144 are closed by the inner wall of bushing 130, the pressure fluid which has flowed into second port 145 of rotary valve 140 from hydraulic pump P remains in first and second ports 144 and 145 of rotary valve 140. That is, the pressure fluid is not introduced into wheel cylinder B. In addition, since the other end of third port 146 of rotary valve 140 is closed by the inner wall of bushing 130, the pressure fluid that has been introduced into wheel cylinder B does not flow backwards so that the brake pressure applied to the wheels is constantly maintained.

On the other hand, since first port 144 of rotary valve 140 is located below perforation hole 138 of bushing 130, first port 144 of rotary valve 140 can not communicate with perforation hole 138 of bushing 130 so that the pressure fluid does not return to fluid tank T.

In addition, since sliding portion 234 of moving terminal section 232 has slid clockwise at an angle of 60 degrees along the upper surface of annular-pattern resistance section 231, the value of the resistance may be varied. Variable resistance 230 transmits electric signal S based on the varied resistance to the ECU. Upon receiving electric signal S from variable resistance 230, the ECU compares the value of electric signal S with a predetermined value and determines that rotary valve 140 is positioned under the pressure maintaining mode.

When rotary valve 140 is further rotated clockwise at an angle of 60 degrees by motor 120, one end of third port 146 of rotary valve 140 communicates with inlet hole 134 of bushing 130 through elongated groove 147 and one end of first port 144 of rotary valve 140 communicates with outlet hole 136 of bushing 130. In addition, one end of second port 145 of rotary valve 140 communicates through first elongated groove 143 with perforation hole 138 connected to fluid tank T.

In addition, sliding portion 234 of moving terminal section 232 is also further rotated clockwise at an angle of 60 degrees according to the rotation of motor shaft 122. From this state, the pressure reducing mode starts.

In the pressure reducing mode, since the other end of third port 146 is closed by the inner wall of bushing 130, the pressure fluid which has flowed into third port 146 of rotary valve 140 from hydraulic pump P remains in third port of rotary valve 140 so that the pressure fluid is not introduced into wheel cylinder B.

However, as mentioned above, second port 145 communicated with perforation hole 138 of bushing 130 is also communicated with wheel cylinder B through first port 144 of rotary valve 140 so that the pressure fluid that has been introduced into wheel cylinder B may return to fluid tank T through second cutting portion 135 of bushing 130, second port 145 of rotary valve 140, first elongated groove 143 and perforation hole 138 of bushing 130, due to the pressure difference between second port 145 of rotary valve 140 and fluid tank T. Thus, the brake pressure applied to the wheels is reduced.

On the other hand, as described above, since bushing 130 has plane portion 132 in the vicinity of fluid tank T, the pressure fluid may easily return to fluid tank T.

In the pressure reducing mode, since sliding portion 234 of moving terminal section 232 has further slid clockwise at an angle of 60 degrees along the upper surface of annular-pattern resistance section 231, the resistance is further varied. Variable resistance 230 transmits the electric signal based on the further varied resistance to the ECU. Upon receiving the electric signal from variable resistance 230, the ECU compares the value of electric signal S with a predetermined value and determines that rotary valve 140 is positioned under the pressure reducing mode.

While, in the course of each mode, third port 146 of rotary valve 140, which is longitudinally spaced at a predetermined length apart from first and second ports 144 and 145, is also alternately communicated with inlet, outlet and perforation holes 134, 136 and 138 of bushing 130 so that the pulsation of rotary valve 140 caused by the deviation of the pressure fluid can be reduced.

Brake pressure control apparatus 100 of the present invention rapidly repeats the pressure increasing mode, the pressure maintaining mode and the pressure reducing mode in a short time period, thereby preventing the wheels from locking when the driver suddenly puts on the brake.

On the other hand, when the operation of the ABS has finished, it is possible for rotary valve 140 to stop at the second position in which the pressure maintaining mode is performed, or the third position in which pressure reducing mode is performed, rather than stopping at the first position in which the pressure increasing mode is performed. However, when the rotary valve 140 stops at the second or third positions, the ECU detects the positions of rotary valve 140 and then further operates motor 120 so as to return rotary valve 140 to its initial position.

Figure 6:
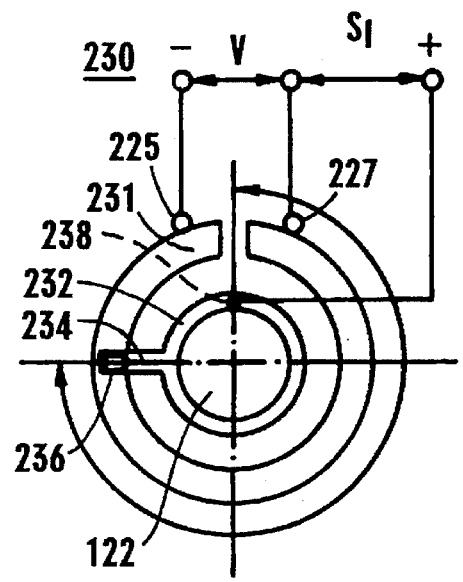
FIG. 6 is a plan view of the variable resistance in which a sliding portion of the variable resistor has rotated clockwise at an angle of 270 degrees according to the rotation of the rotary valve.
Figure 7:
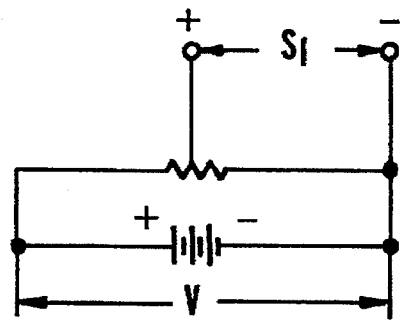
FIG. 7 is a circuit diagram of the variable resistor shown in FIG. 6.

For example, as shown in FIGS. 6 and 7, when rotary valve 140 stops rotating at an angle of 270 degrees from its initial position after the ABS operation has finished, sliding portion 234 of moving terminal section 232 also stops rotating at an angle of 270 degrees from its initial position. At this time, since contacting portion 236 which is provided on sliding portion 234 in order to contact annular-pattern resistance section 231, has rotated clockwise on annular-pattern resistance section 231 to an angle of 270 degrees, the value of the resistance is varied to a quarter of the whole resistance value.

Therefore, according to Ohm's law V=I*R (wherein, V is a voltage, I is a current, and R is a resistance), the value of the current I is increased.

Then, variable resistor 230 transmits an electric signal $S_1$ in response to the varied resistance to the ECU. Upon receiving electric signal $S_1$ from variable resistor 230, the ECU compares the value of electric signal $S_1$ with a predetermined value which is preset in the ECU and determines that rotary valve 140 will stop rotating at an angle of 270 degrees from its initial position.

Therefore, the ECU further operates motor 120 so as to rotate sliding portion 234 of variable resistance 230 in such a manner that the value of electric signal $S_1$ can be equal to the value of first electric signal S which is transmitted from variable resistance 230 when sliding portion 234 of variable resistance 230 is positioned between first and second ends 221 and 223 of annular-pattern resistance section 231.

On the other hand, as motor 120 is further operated by the ECU, rotary valve 140 is also rotated by the rotating of motor shaft 122.

When sliding portion 234 has moved between first and second ends 221 and 223 of annular-pattern resistance section 231 by the rotating of motor shaft 122, the value of electric signal $S_1$ reaches the value of first electric signal S. As mentioned above, this state presents that rotary valve 140 is positioned under the pressure increasing mode.

In this manner, rotary valve 140 is returned to its initial position after the ABS operation has finished, so that the pressure fluid may instantly flow from hydraulic pump P into wheel cylinder B through rotary valve 140.

In the mean time, though the sensor assembly is described as it is provided at the upper inner wall of the motor cap, according to another embodiment, the sensor assembly may be provided at the bottom wall of the motor cap.

As described above, the brake pressure control apparatus for anti-lock braking system in vehicles according to the present invention has a simple construction and can be easily manufactured.

Further, the brake pressure control apparatus of the present invention has a compact size so that it can be easily applied to an ABS.

Furthermore, the brake pressure control apparatus of the present invention does not require many elements so that the cost for manufacturing the brake pressure control apparatus can be reduced.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A brake pressure control apparatus for an anti-lock braking system in automobiles, the apparatus comprising:

a housing for receiving a pressure fluid from a hydraulic pump, the housing being connected to the hydraulic pump, the housing having a chamber, a first fluid path connected to the hydraulic pump for guiding the pressure fluid, and a second fluid path connected to a wheel cylinder for guiding the pressure fluid to the wheel cylinder; a first means for generating a rotational force according to an operating signal from an electrical control unit, the first means including a motor having a motor shaft, the motor being mounted on an upper surface of the housing, the motor shaft being formed integrally with a spline shaft at its one end, the motor being covered by a motor cap;

a second means for guiding the pressure fluid that flows through the housing, the second means including a cylindrical bushing securely accommodated in the chamber of the housing, the cylindrical bushing having a plane portion at its outer wall so as to easily return the pressure fluid to a fluid tank, the cylindrical bushing having a first cutting portion and a second cutting portion at its cylindrical outer wall, the first cutting portion being located in correspondence to the first fluid path of the housing in such a manner that the pressure fluid can easily flow from the first fluid path of the housing into the cylindrical bushing, and the second cutting portion being located in correspondence to the second fluid path of the housing in such a manner that the pressure fluid that passes through the cylindrical bushing can easily flow into the second fluid path of the house, the first cutting portion being provided at a bottom thereof with an inlet hole for receiving the pressure fluid from the housing, the second cutting portion being provided at a bottom thereof with an outlet hole for guiding the pressure fluid to the wheel cylinder, and the plane portion being provided with a perforation hole in order to communicate with the fluid tank, the perforation hole being longitudinally spaced upwards at a predetermined length apart from the inlet and outlet holes;

a third means for receiving the pressure fluid guided by the second means so as to transfer the pressure fluid to the wheel cylinder or the fluid tank alternately, the third means being rotatably accommodated in the second means and rotated by the first means; and a fourth means for sensing an electric signal which varies according to a rotation of the third means and then transmitting the electric signal to the electrical control unit, wherein the electrical control unit detects positions of the third means and operates the first means after an operation of the anti-lock braking system has finished so as to return the third means to its initial position.

2. The apparatus as claimed in claim 1, wherein the first and the second cutting portions have a rectangular groove shape and are disposed at a same longitudinal level, the second cutting portion being spaced clockwise at an angle of 120 degrees apart from the first cutting portion.

3. The apparatus as claimed in claim 1, wherein the third means includes a rotary valve, the rotary valve having a first port, a second port, a third port, a first elongated groove extended downwards from a first end of the second port, a second elongated groove extended downwards from a second end of the second port, a third elongated groove extended upwards from a first end of the third port, and a fourth elongated groove extended upwards from a second end of the third port, each of the first port, the second port and the third port being alternately communicated with the inlet hole, the outlet hole and the perforation hole as the rotary valve rotates.

4. The apparatus as claimed in claim 3, wherein the rotary valve is provided at its outer wall with an oil groove for reducing a friction between the outer wall of the rotary valve and an inner wall of the cylindrical bushing when the rotary valve rotates.

5. The apparatus as claimed in claim 3, wherein the rotary valve further comprises a spline groove formed at a center of an upper surface of the rotary valve, the spline shaft of the motor being inserted in the spline groove so that the rotary valve may rotate as the spline shaft of the motor rotates.

6. The apparatus as claimed in claim 3, wherein the first and second ports of the rotary valve are intercrossed with each other at a same plane, the second port being positioned clockwise at an angle of 120 degrees apart from the first port and the third port being positioned clockwise at an angle of 120 degrees apart from the second port in a plan view.

7. The apparatus as claimed in claim 3, wherein the first and second elongated grooves have the same size as the third and fourth elongated grooves, each of the first, second, third and fourth elongated grooves being alternately and continuously communicated with the inlet, the outlet and the perforation holes of the cylindrical bushing as the rotary valve rotates.

8. The apparatus as claimed in claim 3, wherein the fourth means includes a sensor assembly provided at an inner upper wall of the motor cap, the sensor assembly having a supporting member secured to the inner upper wall of the motor cap and a variable resistor coupled to the supporting member.

9. The apparatus as claimed in claim 8, wherein the sensor assembly is provided at a bottom wall of the motor cap.

10. The apparatus as claimed in claim 8, wherein the supporting member has a first surface secured to the upper inner wall of the motor cap and a second surface formed with an annular recess and a slot thereon, and the variable resistor has an annular-pattern resistance section securely inserted in the annular recess of the supporting member, a moving terminal section which slides along an upper surface of the annular-pattern resistance section as the motor shaft rotates, and a fixed portion inserted in the slot of the supporting member such that the fixed portion continuously contacts the moving terminal section.

11. The apparatus as claimed in claim 10, wherein the annular-pattern resistance section of the variable resistor has first and second ends between which a difference in potential is generated as the electric signal is applied to them, the first and second ends having first and second terminals respectively, the first and second ends being connect with a wire.

12. The apparatus as claimed in claim 10, wherein the moving terminal section is closely disposed around the motor shaft such that the moving terminal section can rotate together with the motor shaft, the moving terminal section being integrally formed with a sliding portion which slides along the upper surface of the annular-pattern resistance section so as to generate a variable electric signal.

13. The apparatus as claimed in claim 10, wherein the sliding portion is provided with a contacting portion for contacting the upper surface of the annular-pattern resistance section.

14. The apparatus as claimed in claim 10, wherein the moving terminal section is insulated from the motor shaft so as to prevent a leakage of the electric signal therebetween.

15. A brake pressure control apparatus for an anti-lock braking system in automobiles, the apparatus comprising:

a housing for receiving a pressure fluid from a hydraulic pump, the housing having a first fluid path connected to the hydraulic pump for guiding the pressure fluid, a second fluid path connected to a wheel cylinder for introducing the guided pressure fluid into the wheel cylinder, and a chamber formed between the first fluid path and the second fluid path;

a motor for generating a rotational force according to an operating signal from an electrical control unit, the motor having a motor shaft formed integrally with a spline shaft at its end and a motor cap accommodating the motor, the motor being mounted on an upper surface of the housing;

a bushing securely accommodated in the chamber of the housing for guiding the pressure fluid which has been introduced through the first fluid path of the housing, the bushing having a cylindrical shape and a portion of its outer wall being shaped as a plane portion so as to easily return the pressure fluid to a fluid tank, the bushing having a first cutting portion and a second cutting portion at its outer wall, the first cutting portion being located in correspondence to the first fluid path of the housing in such a manner that the pressure fluid can easily flow from the first fluid path of the housing into the bushing and the second cutting portion being located in correspondence to the second fluid path of the housing in such a manner that the pressure fluid that has passed through the bushing can easily flow into the second fluid path of the housing, the first and second cutting portions having a rectangular groove shape and being disposed at a same longitudinal level, the second cutting portion being spaced clockwise at an angle of 120 degrees apart from the first cutting portion, the plane portion of the bushing being spaced counterclockwise at an angle of 120 degrees apart from the first cutting portion, the first cutting portion being provided at a bottom of the first cutting portion with an inlet hole for receiving the pressure fluid from the housing, the second cutting portion being provided at a bottom of the second cutting portion with an outlet hole for guiding pressure fluid to the wheel cylinder and the plane portion being provided at a bottom of the plane portion with a perforation hole for communicating with the fluid tank, the perforation hole being longitudinally upward spaced at a predetermined length apart from the inlet and the outlet holes;

a rotary valve rotatably accommodated in the bushing for receiving pressure fluid from the bushing and then for transferring the pressure fluid to the wheel cylinder or the fluid tank alternately, the rotary valve having a first port, a second port, a third port, a first elongated groove extended downwards from a first end of the second port, a second elongated groove extended downwards from a second end of the second port, a third elongated groove extended upwards from a first end of the third port and a fourth elongated groove extended upwards from a second end of the third port, each of the first port, the second port and the third port being alternately communicated with the inlet hole, the outlet hole and the perforation hole of bushing as the rotary valve rotates, the rotary valve being provided at its outer wall with an oil groove for reducing a friction between the outer wall of the rotary valve and an inner wall of bushing when the rotary valve rotates, the rotary valve further having a spline groove formed at a center of an upper surface of the rotary valve, the spline shaft of the motor being inserted in the spline groove so that the rotary valve rotates as the spline shaft rotates, the first and second ports of the rotary valve being located in correspondence to the inlet hole and the outlet hole of the bushing, and the third port of the rotary valve being located in correspondence to the perforation hole of the bushing, the first port and the second port being interconnected with each other at a same plane, the second port being positioned clockwise at an angle of 120 degrees apart from the first port and the third port being positioned clockwise at an angle of 120 degrees apart from the second port in a plan view, the first and second elongated grooves having the same size as the third and fourth elongated grooves, each of the first, the second, the third and the fourth elongated grooves being alternately and continuously communicated with the inlet, the outlet and the perforation holes of the bushing as the rotary valve rotates; and a sensor assembly for sensing an electric signal which varies according to a rotation of the rotary valve and then transmitting the electric signal to the electrical control unit, the sensor assembly being provided at an inner upper wall of the motor cap, the sensor assembly having a supporting member secured to the inner upper wall of the motor cap and a variable resistor coupled to the supporting member, the supporting member having a first surface secured to the upper inner wall of the motor cap and a second surface formed with an annular recess and a slot thereon, the variable resistor having an annular-pattern resistance section securely inserted in the annular recess of the supporting member, a moving terminal section which slides along an upper surface of the annular-pattern resistance section as the motor shaft rotates, and a fixed portion inserted in the slot of the supporting member such that the fixed portion continuously contacts the moving terminal section, the annular-pattern resistance section having first and second ends between which a difference in potential is generated as the electric signal is applied to them, the first and second ends having first and second terminals respectively, the first and second ends being connect with a wire, the moving terminal section being closely disposed around the motor shaft such that the moving terminal section can rotate together with the motor shaft, the moving terminal section being integrally formed with a sliding portion which slides along the upper surface of the annular-pattern resistance section so as to generate a variable electric signal, the sliding portion being provided with a contacting portion for contacting the upper surface of the annular-pattern resistance section, the moving terminal section being insulated from the motor shaft so as to prevent a leakage of the electric signal therebetween, wherein the electrical control unit detects positions of the rotary valve and operates the motor after an operation of the anti-lock braking system has finished so as to return the rotary valve to its initial position.

* * * * *